United States Patent
Mathur et al.

(10) Patent No.: US 8,008,237 B2
(45) Date of Patent: Aug. 30, 2011

(54) METHOD FOR MAKING A TITANIUM-CONTAINING LUBRICANT ADDITIVE

(75) Inventors: Naresh C Mathur, Midlothian, VA (US); Jeffrey M Guevremont, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 508 days.

(21) Appl. No.: 12/141,301

(22) Filed: Jun. 18, 2008

(65) Prior Publication Data

US 2009/0318318 A1    Dec. 24, 2009

(51) Int. Cl.
C10M 159/12    (2006.01)

(52) U.S. Cl. ........ 508/221; 508/165; 508/287; 508/542; 508/545

(58) Field of Classification Search ................. 508/108, 508/577, 165, 221, 287, 542, 545; 423/608, 423/609, 610
See application file for complete search history.

(56) References Cited

U.S. PATENT DOCUMENTS

| | | | |
|---|---|---|---|
| 2,384,577 A | 9/1945 | Thomas | |
| 2,710,872 A | 6/1955 | Thompson | |
| 2,786,866 A | 3/1957 | Hook et al. | |
| 2,897,152 A | 7/1959 | Elliot et al. | |
| 3,219,666 A | 11/1965 | Norman et al. | |
| 3,407,222 A | 10/1968 | Lies | |
| 3,565,804 A | 2/1971 | Honnen et al. | |
| 3,697,574 A | 10/1972 | Piasek et al. | |
| 3,736,357 A | 5/1973 | Piasek et al. | |
| 3,867,359 A | 2/1975 | Beadle | |
| 4,164,473 A | 8/1979 | Coupland et al. | |
| 4,178,258 A | 12/1979 | Papay et al. | |
| 4,234,435 A | 11/1980 | Meinhardt et al. | |
| 4,259,195 A | 3/1981 | King et al. | |
| 4,261,843 A | 4/1981 | King et al. | |
| 4,263,152 A | 4/1981 | King et al. | |
| 4,265,773 A | 5/1981 | deVries et al. | |
| 4,266,945 A | 5/1981 | Kam | |
| 4,272,387 A | 6/1981 | King et al. | |
| 4,283,295 A | 8/1981 | deVries et al. | |
| 4,285,822 A | 8/1981 | deVries et al. | |
| 4,362,633 A | 12/1982 | Spence et al. | |
| 4,369,119 A | 1/1983 | deVries et al. | |
| 4,395,343 A | 7/1983 | deVries et al. | |
| 4,402,840 A | 9/1983 | deVries et al. | |
| 4,466,901 A | 8/1984 | Hunt et al. | |
| 4,636,322 A | 1/1987 | Nalesnik | |
| 4,692,256 A | 9/1987 | Umemura et al. | |
| 4,758,362 A | 7/1988 | Butke | |
| 4,765,918 A | 8/1988 | Love et al. | |
| 4,867,890 A | 9/1989 | Colclough et al. | |
| 4,876,375 A | 10/1989 | Lam | |
| 4,885,365 A | 12/1989 | Lam | |
| 4,889,647 A | 12/1989 | Rowan et al. | |
| 4,927,552 A | 5/1990 | Lam | |
| 4,957,643 A | 9/1990 | Lam | |
| 4,966,719 A | 10/1990 | Coyle et al. | |
| 4,978,464 A | 12/1990 | Coyle et al. | |
| 4,990,271 A | 2/1991 | Francis | |
| 4,995,996 A | 2/1991 | Coyle et al. | |
| 5,137,647 A | 8/1992 | Karol | |
| 5,204,012 A | 4/1993 | Schaffhausen | |
| 5,412,130 A | 5/1995 | Karol | |
| 5,627,259 A | 5/1997 | Thaler et al. | |
| 5,633,326 A | 5/1997 | Patil et al. | |
| 5,643,859 A | 7/1997 | Gutierrez et al. | |
| 5,686,397 A | 11/1997 | Baranski et al. | |
| 5,693,598 A | 12/1997 | Abraham et al. | |
| 5,789,357 A | 8/1998 | Baranski et al. | |
| 5,792,729 A | 8/1998 | Harrison et al. | |
| 5,851,965 A | 12/1998 | Harrison et al. | |
| 5,853,434 A | 12/1998 | Harrison et al. | |
| 5,902,776 A | 5/1999 | Dohner et al. | |
| 5,936,041 A | 8/1999 | Diana et al. | |
| 6,034,040 A | 3/2000 | Ozbalik et al. | |
| 6,509,303 B1 | 1/2003 | Gatto | |
| 6,528,463 B1 | 3/2003 | Gatto et al. | |
| 6,599,865 B1 | 7/2003 | Esche, Jr. et al. | |
| 6,797,677 B2 | 9/2004 | Esche, Jr. et al. | |
| 7,829,598 B2 * | 11/2010 | Iversen et al. | 516/33 |
| 2002/0000532 A1 * | 1/2002 | Takahashi et al. | 252/1 |
| 2004/0161380 A1 * | 8/2004 | Zimehl et al. | 423/610 |
| 2004/0266630 A1 | 12/2004 | George et al. | |
| 2006/0014651 A1 | 1/2006 | Esche et al. | |
| 2006/0217271 A1 * | 9/2006 | Brown et al. | 508/165 |

FOREIGN PATENT DOCUMENTS

EP    330522 B1    8/1989
WO    WO 2007065446 A2 *    6/2007

OTHER PUBLICATIONS

Xue, Liu, Zhang, "Friction and wear properties of a surface-modified TiO2 nanoparticle as an additive in liquid paraffin," Wear, 1997, pp. 29-32, 213, Elsevier Science S.A.
Severin, Ledford, Torgerson, Berglund, "Characterization of Titanium and Zirconium Valerate Sol-Gel Films," Chem. Mater. 1994, pp. 890-898, 6.
D. Papoutsi, P. Lianos, P. Yianoulis, P. Koutsoukos: "Sol-Gel Derived TiO2 Microemulsion Gels and Coatings," Langmuir, vol. 10, No. 6, Jun. 1994, pp. 1684-1689.

* cited by examiner

*Primary Examiner* — Ellen McAvoy
*Assistant Examiner* — Taiwo Oladapo
(74) *Attorney, Agent, or Firm* — Luedeka, Neely & Graham, P.C.

(57) ABSTRACT

A method for making a titanium-containing lubricant additive, a lubricant additive concentrate made by the method and a lubricating composition containing the additive concentrate. The method includes reacting titanium alkoxide with water in a reaction medium that includes a dispersant to provide a homogeneous titanium-containing additive product. The additive product made by the method is substantially devoid of acidic components.

20 Claims, No Drawings

METHOD FOR MAKING A TITANIUM-CONTAINING LUBRICANT ADDITIVE

TECHNICAL FIELD

The disclosure relates to titanium-containing lubricant additives that are substantially devoid of acidic components, and in particular to methods for making homogeneous titanium-containing lubricant additive concentrates that having unique tribological properties.

BACKGROUND AND SUMMARY

Lubricating oils for automotive and diesel engines have changes over the years. Today's engines are designed to run hotter and harder than in the past. Various additives have been used in lubricant formulations in order to reduce friction between moving parts and reduce engine wear. Such additives include organo-molybdenum additives and organo-zinc phosphate additives. While such additives are particularly useful as friction and wear reducers modifiers, such additives may have one or more of the following disadvantages: poor oil solubility; copper and/or lead corrosion; color darkening of the finished lubricant; and increased levels of sulfur and/or phosphorus in the finished lubricant.

Future generations of passenger car motor oils and heavy duty diesel engine oils require lower levels of phosphorus and sulfur in the finished oil in order to protect pollution control devices as it is well known that sulfur and phosphorus containing additives may poison or otherwise reduce the effectiveness of pollution control devices. For example, current GF-4 motor oil specifications require a finished oil to contain less than 0.08 wt % and 0.7 wt % phosphorus and sulfur, respectively, and PC-10 motor oil specifications, the next generation heavy duty diesel engine oil, requires oils to contain less than 0.12 wt % and 0.4 wt % phosphorus and sulfur, respectively, and 1.0 wt % sulfated ash. Certain molybdenum and organo-zinc additives known in the industry contain phosphorus and sulfur at levels which reduce the effectiveness of pollution control devices.

Therefore, a need exists for lubricant additives and compositions that provide enhanced friction and wear reducing properties and which are more compatible with pollution control devices used for automotive and diesel engines. A need also exists for such lubricant additives and compositions which are more compatible with such pollution control devices without adversely affecting oil solubility, corrosion, and/or darkening the color of the finished lubricant. Hydrocarbon soluble organo-titanium compounds are believed to be useful for reducing the amount of molybdenum and/or organo-zinc compounds used in lubricating oil formulations while achieving similar or improved results without adversely affecting pollution control devices on the engines.

The use of organo-titanium compounds typically includes a multi-step synthesis process, purification, and blending of the compounds into additive concentrates and lubricant formulations. However, the foregoing process is time-consuming thus expensive. What is needed is a relatively simple process for making a titanium-containing additive in-situ in a concentrate that can be directly added to an oil of lubricating viscosity.

With regard to the foregoing, exemplary embodiments of the disclosure provide a method for making a titanium-containing lubricant additive, a lubricant additive concentrate made by the method and a lubricating composition containing the additive concentrate. According to embodiments of the disclosure, the method includes reacting titanium alkoxide with water in a reaction medium that includes a dispersant to provide a homogeneous titanium-containing additive product. The additive product made by the method is substantially devoid of acidic components.

Another exemplary embodiment of the disclosure provides a titanium additive product for a lubricating oil. The additive product includes a titanium product made by a process of reacting titanium alkoxide with water in a reaction medium including a dispersant at a temperature ranging from about 25° to about 140° C. to provide a homogeneous titanium-containing additive product. The additive product in a base oil is no more corrosive than the base oil devoid of the additive product as determined by a high temperature corrosion bench test.

An advantage of the embodiments of the disclosure is that a substantially precipitate free product may be formed. The product is believed to be less corrosive in lubricating oil formulations since the product is not made using acidic reactants. Blending of the product with other components of a lubricating oil composition may be more precise due to an absence of visible particles and precipitates in the additive product as made. Other features and advantages of the disclosed embodiments may be provided by the following detailed description.

DETAILED DESCRIPTION OF EXEMPLARY EMBODIMENTS

As set forth herein, the disclosure provides an in-situ method for making a homogenous titanium-containing additive product that may have enhanced wear and friction reducing properties when used in a lubricating oil composition. The exact nature of the product made by the method is not known and has not been fully characterized despite extensive efforts to determine the exact nature of the product. Particles of product made by the disclosed process were observed using a transmission electron microscope by solvent rinsing the product. The particles appeared to range in size from about 24 nanometers (nm) to about 370 nm and the particles had a spherical to cylindrical shape. Accordingly, it is believed that the titanium product may include non-acidic titanium oxide nanoparticles of the formula $Ti_xO_y$, wherein a ratio of x to y ranges from about 1:1 to about 1:10 and wherein the titanium oxide nanoparticles are readily dispersible or dissolvable in an organic fluid. It is also possible that the titanium product may include a polytitanoxane product of the formulas:

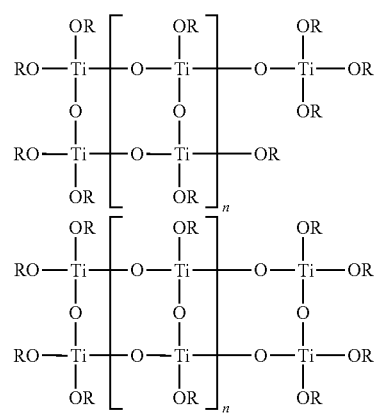

wherein R is an alkyl group containing from 1 to 10 carbon atoms and n is an integer ranging from about 1 to about 1000. It is also possible that the product is a mixture of titanium oxide nanoparticles and polytitanoxanes.

For the purposes of this disclosure, a "homogeneous product" means that the titanium-containing component may be dissolved in, dispersed in, or emulsified in an organic fluid whereby discrete particles and precipitates are undetectable with the unaided human eye.

A fist step in preparing a product according to the disclosure is to heat a mixture of dispersant and optionally, process oil to room temperature or to an elevated temperature. Process oil is used to reduce the viscosity of the mixture and typically acts as a diluent. The dispersant may be selected from a wide variety of ashless dispersants, including but not limited to, compounds having an oil soluble polymeric hydrocarbon backbone having functional groups that are capable of associating with titanium-containing additive. Typically, the dispersants comprise amine, alcohol, amide, or ester polar moieties attached to the polymer backbone often via a bridging group. Dispersants may be selected from Mannich dispersants as described, for example, in U.S. Pat. Nos. 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729. A particularly suitable dispersant is a polyisobutenyl succinimide dispersant wherein the polyisobutenyl group has a number average molecular weight ranging from about 1000 to about 5000 and the succinimide has a total base number (TBN) ranging from about 10 to about 50. The ashless dispersant is typically provided as a mixture in process oil wherein the mixture includes from about 30 to about 60 weight percent of the dispersant with the balance being the process oil. Accordingly, the reaction medium may include from about 10 to about 60 percent by weight of the ashless dispersant and from about 40 to about 90 percent process oil.

The reaction medium including the dispersant and optional process oil is then typically heated to a temperature in the range of from about 25° to about 100° C. under an inert gas atmosphere in order to reduce the viscosity of the mixture prior to adding a titanium alkoxide compound to the reaction medium. Suitable titanium alkoxide compounds may be selected from alkoxides containing from about 1 to about 10 carbon atoms such as, titanium methoxide, titanium ethoxide, titanium isopropoxide, titanium propoxide, titanium butoxide, titanium secondary butoxide, titanium t-butoxide, titanium hexoxide, titanium octoxide, and the like. A molar ratio of titanium alkoxide to the dispersant in the reaction medium may range from about 1:1 to about 10:1 alkoxide to dispersant.

The titanium alkoxide, dispersant and optional process oil provides a reaction mixture to which water is added with or without an inert solvent. The inert solvent, when used, may be any water-miscible solvent. A suitable solvent is an alkanol. The alkanol may be selected from $C_2$ to $C_5$ alkanols such as ethanol, propanol, isopropanol, butanol, isobutanol, tert butyl alcohol, amyl alcohol, isoamyl alcohol, diethyl carbinol, methyl(n)propyl carbinol, methyl isopropyl carbinol, dimethyl ethyl carbinol, and the like. Glyclols such as ethylene glycol and propylene glycol may also be used. When a solvent is used, the inert solvent/water mixture may include from about 0.5 to about 1.5 moles of solvent per mole of water. With respect to the titanium alkoxide component, the ratio of water to titanium alkoxide in the reaction mixture may range from about 1:1 to about 2:1. It is understood that more than about 2 moles of water per mole of titanium alkoxide may become a solvent as the titanium alkoxide may become completely hydrolyzed to titanium dioxide.

Once all of the water or alkanol/water mixture has been added to the reaction mixture, the reactants are heated to a temperature ranging from about 25° to about 140° C. for a period of time ranging from about 30 minutes to 90 minutes, and then the product is vacuum stripped to provide a substantially homogenous product that contains no readily visible particles. The product may contain from about 1 to about 5 percent titanium on a metal basis. The product may be added directly to a lubricating oil, or may be formulated with additional components to provide a lubricating oil concentrate.

In the preparation of lubricating oil formulations it is common practice to introduce concentrate in the form of 1 to 99 wt. % active ingredient in a hydrocarbon oil, e.g. mineral lubricating oil, or other suitable solvent. Usually these concentrates may be added to a lubricating oil along with a dispersant/inhibitor (DI) additive package and viscosity index (VI) improvers containing 0.01 to 50 parts by weight of lubricating oil per part by weight of the DI package to form finished lubricants, e.g. crankcase motor oils. Suitable DI packages are described for example in U.S. Pat. Nos. 5,204,012 and 6,034,040 for example. Among the types of additives included in the DI additive package are detergents, dispersants, antiwear agents, friction modifiers, seal swell agents, antioxidants, foam inhibitors, lubricity agents, rust inhibitors, corrosion inhibitors, demulsifiers, viscosity index improvers, and the like. Several of these components are well known to those skilled in the art and are preferably used in conventional amounts with the additives and compositions described herein.

Lubricant compositions made with the titanium-containing additives described above are used in a wide variety of applications. For compression ignition engines and spark ignition engines, it is preferred that the lubricant compositions meet or exceed published GF-4 or API-CI-4 standards. Lubricant compositions according to the foregoing GF-4 or API-CI-4 standards include a base oil, the DI additive package, and/or a VI improver to provide a fully formulated lubricant. The base oil for lubricants according to the disclosure is an oil of lubricating viscosity selected from natural lubricating oils, synthetic lubricating oils and mixtures thereof. Such base oils include those conventionally employed as crankcase lubricating oils for spark-ignited and compression-ignited internal combustion engines, such as automobile and truck engines, marine and railroad diesel engines, and the like. Fully formulated lubricant compositions including the titanium-containing additives may have a titanium concentration ranging from about 10 to about 1000 ppm based on titanium metal. More typically, the fully formulated lubricant composition may contain from about 50 to about 500 ppm titanium on a metal basis.

Phosphorus-Containing Compounds

One component of the DI additive package is a phosphorus-containing compound such as ZDDP. Suitable ZDDPs may be prepared from specific amounts of primary and secondary alcohols. For example, the alcohols may be combined in a ratio of from about 100:0 to about 0:100 primary-to-secondary alcohols. As an even further example, the alcohols may be combined in a ratio of about 60:40 primary-to-secondary alcohols. An example of a suitable ZDDP may comprise the reaction product obtained by combining: (i) about 50 to about 100 mol % of about $C_1$ to about $C_{18}$ primary alcohol; (ii) up to about 50 mol % of about $C_3$ to about $C_{18}$ secondary alcohol; (iii) a phosphorus-containing component; and (iv) a zinc-containing component. As a further example, the primary alcohol may be a mixture of from about $C_1$ to about $C_{18}$ alcohols. As an even further example, the primary alcohol may be a mixture of a $C_4$ and a C8 alcohol. The secondary alcohol may also be a mixture of alcohols. As an example, the secondary alcohol may comprise a $C_3$ alcohol. The alcohols may contain any of branched, cyclic, or straight chains. The ZDDP may comprise the combination of about 60 mol % primary alcohol and about 40 mol % secondary alcohol. In the alternative, the ZDDP may comprise 100 mol % secondary alcohols, or 100 mol % primary alcohols.

The phosphorus-containing component of the phosphorus-containing compound may comprise any suitable phosphorus-containing component such as, but not limited to a phosphorus sulfide. Suitable phosphorus sulfides may include phosphorus pentasulfide or tetraphosphorus trisulfide.

The zinc-containing component may comprise any suitable zinc-containing component such as, but not limited to zinc oxide, zinc hydroxide, zinc carbonate, zinc propylate, zinc chloride, zinc propionate, or zinc acetate.

The reaction product may comprise a resulting mixture, component, or mixture of components. The reaction product may or may not include unreacted reactants, chemically bonded components, products, or polar bonded components.

The ZDDP or ash-containing phosphorus compound may be present in an amount sufficient to contribute from about 0.03 wt % to about 0.15 wt % phosphorus in the lubricant composition.

In addition to, or in the alternative, an ash-free phosphorus compound may be included in a mixture of phosphorus-containing compounds. The ash-free phosphorus compound may be selected from an organic ester of phosphoric acid, phosphorous acid, or an amine salt thereof. For example, the ash-free phosphorus-containing compound may include one or more of a dihydrocarbyl phosphite, a trihydrocarbyl phosphite, a monohydrocarbyl phosphate, a dihydrocarbyl phosphate, a trihydrocarbyl phosphate, any sulfur analogs thereof, and any amine salts thereof. As a further example, the ash-free phosphorus-containing compound may include at least one or a mixture of monohydrocarbyl- and dihydrocarbyl phosphate amine salt, for example, an amyl acid phosphate salt may be a mixture of monoamyl acid phosphate salt and diamyl acid phosphate salt.

A weight ratio based on phosphorus from the ash-containing phosphorus compound and phosphorus from the ash-free phosphorus compound in the lubricating oil composition may range from about 3:1 to about 1:3. Another mixture of phosphorus compounds that may be used may include from about 0.5 to about 2.0 parts by weight of phosphorus from an ash-containing phosphorus compound to about 1 part weight of phosphorus from an ash-free phosphorus compound. Yet another mixture of phosphorus compounds may include about equal parts by weight of phosphorus from the ash-containing phosphorus compound and phosphorus from the ash-free phosphorus compound. Examples of mixtures of phosphorus from the ash-containing and phosphorus from the ash-free phosphorus compounds are provided in the following table.

The mixture of phosphorus-containing compounds in the lubricating oil formulation may be present in an amount sufficient to provide from about 300 to about 1200 parts per million by weight of total phosphorus in the lubricating oil formulation. As a further example, the mixture of phosphorus-containing compounds may be present in an amount sufficient to provide from about 500 to about 800 parts per million by weight of total phosphorus in the lubrication oil formulation.

Representative effective amounts of additives, when used in crankcase lubricants, are listed in Table 1 below. All the values listed are stated as weight percent active ingredient.

TABLE 1

| Component | Wt. % (Broad) | Wt. % (Typical) |
|---|---|---|
| Dispersant | 0.5-10.0 | 1.0-5.0 |
| Antioxidant system | 0-5.0 | 0.01-3.0 |
| Metal Detergents | 0.1-15.0 | 0.2-8.0 |
| Corrosion Inhibitor | 0-5.0 | 0-2.0 |
| Metal dihydrocarbyl dithiophosphate | 0.1-6.0 | 0.1-4.0 |
| Ash-free amine phosphate salt | 0.1-6.0 | 0.1-4.0 |
| Antifoaming agent | 0-5.0 | 0.001-0.15 |
| Titanium-containing additive | 0-5.0 | 0-2.0 |
| Supplemental antiwear agents | 0-1.0 | 0-0.8 |
| Pour point depressant | 0.01-5.0 | 0.01-1.5 |
| Viscosity modifier | 0.01-20.00 | 0.25-10.0 |
| Supplemental friction modifier | 0-2.0 | 0.1-1.0 |
| Base oil | Balance | Balance |
| Total | 100 | 100 |

Dispersant Components

Dispersants contained in the DI package include, but are not limited to, the dispersants described above that are used to make the titanium-containing additive component.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having $C_5$ to $C_{12}$ alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used in combination with the hydrocarbon soluble titanium compounds, include sterically hindered phenols and diarylamines, alkylated phenothiazines, sulfurized compounds, and ashless dialkyldithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary-butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebis(4-methyl-6 tert-butylphenol, 4,4-methylenebis(2,6-di-tert-butylphenol) and mixtures thereof as described in U.S Publication No. 2004/0266630.

Diarylamine antioxidants include, but are not limited to diarylamines having the formula:

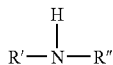

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononylphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyl-diphenylamine; p-oriented styrenated diphenylamine; mixed butyloctyldi-phenylamine; and mixed octylstyryldiphenylamine.

Another class of aminic antioxidants includes phenothiazine or alkylated phenothiazine having the chemical formula:

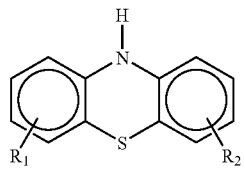

wherein $R_1$ is a linear or branched $C_1$ to $C_{24}$ alkyl, aryl, heteroalkyl or alkylaryl group and $R_2$ is hydrogen or a linear or branched $C_1$-$C_{24}$ alkyl, heteroalkyl, or alkylaryl group. Alkylated phenothiazine may be selected from the group consisting of monotetradecylphenothiazine, ditetradecylphenothiazine, monodecylphenothiazine, didecylphenothiazine, mononyonylphenothiazine, dinonylphenothiazine, monooctylphenothiazine, dioctylphenothiazine, monobutylphenothiazine, dibutylphenothiazine, monostyrylphenothiazine, distyrylphenothiazine, butyloctylphenothiazine, and styryloctylphenothiazine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soyabean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 weight % sulfur, when added to the finished lubricant at a 1.0 weight % treat level, will deliver 2000 ppm of sulfur to the finished lubricant. A sulfurized fatty oil or olefin containing 10 weight % sulfur, when added to the finished lubricant at a 1.0 weight % treat level, will deliver 1000 ppm sulfur to the finished lubricant. It is preferred to add the sulfurized olefin or sulfurized fatty oil to deliver between 200 ppm and 2000 ppm sulfur to the finished lubricant. The foregoing aminic, phenothiazine, and sulfur containing antioxidants are described for example in U.S. Pat. No. 6,599,865.

The ashless dialkyldithiocarbamates which may be used as antioxidant additives include compounds that are soluble or dispersable in the additive package. It is also preferred that the ashless dialkyldithiocarbamate be of low volatility, preferably having a molecular weight greater than 250 daltons, most preferably having a molecular weight greater than 400 daltons. Examples of ashless dithiocarbamates that may be used include, but are not limited to, methylenebis(dialkyldithiocarbamate), ethylenebis(dialkyldithiocarbamate), isobutyl disulfide-2,2'-bis(dialkyldithiocarbamate), hydroxyalkyl substituted dialkyldithio-carbamates, dithiocarbamates prepared from unsaturated compounds, dithiocarbamates prepared from norbornylene, and dithiocarbamates prepared from epoxides, where the alkyl groups of the dialkyldithiocarbamate can preferably have from 1 to 16 carbons. Examples of dialkyldithio-carbamates that may be used are disclosed in the following patents: U.S. Pat Nos. 5,693,598; 4,876,375; 4,927,552; 4,957,643; 4,885,365; 5,789,357; 5,686,397; 5,902,776; 2,786,866; 2,710,872; 2,384,577; 2,897,152; 3,407,222; 3,867,359; and 4,758,362.

Examples of suitable ashless dithiocarbamates are: Methylenebis-(dibutyldithiocarbamate), Ethylenebis(dibutyldithiocarbamate), Isobutyl disulfide-2,2'-bis(dibutyldithiocarbamate), Dibutyl-N,N-dibutyl-(dithiocarbamyl) succinate, 2-hydroxypropyl dibutyldithiocarbamate, Butyl (dibutyldithiocarbamyl)acetate, and S-carbomethoxy-ethyl-N,N-dibutyl dithiocarbamate. The most preferred ashless dithiocarbamate is methylenebis(dibutyldithiocarbamate).

Organomolybdenum containing compounds used as friction modifiers may also exhibit antioxidant functionality. U.S. Pat. No. 6,797,677 describes a combination of organomolybdenum compound, alkylphenothizine and alkyldiphenylamines for use in finished lubricant formulations. Examples of suitable molybdenum containing friction modifiers are described below under friction modifiers.

Friction Modifier Components

A sulfur- and phosphorus-free organomolybdenum compound that may be used as a friction modifier, if desired, may be prepared by reacting a sulfur- and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups may be monoamines, diamines, or polyamines. The alcohol groups may be mono-substituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free organomolybdenum compounds include compounds described in the following patents: U.S. Pat. Nos. 4,259,195; 4,261,843; 4,164,473; 4,266,945; 4,889,647; 5,137,647; 4,692,256; 5,412,130; 6,509,303; and 6,528,463.

Molybdenum compounds prepared by reacting a fatty oil, diethanolamine, and a molybdenum source as described in U.S. Pat. No. 4,889,647 are sometimes illustrated with the following structure, where R is a fatty alkyl chain, although the exact chemical composition of these materials is not fully known and may in fact be multi-component mixtures of several organomolybdenum compounds.

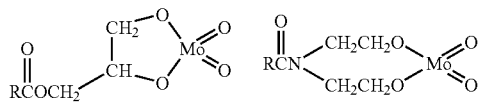

Sulfur-containing organomolybdenum compounds may be used and may be prepared by a variety of methods. One method involves reacting a sulfur and phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing molybdenum compound may be prepared by reacting a sulfur-containing molybdenum source with an amino group or thiuram group and optionally a second sulfur source. Examples of sulfur- and phosphorus-free molybdenum sources include molybdenum trioxide, ammonium molybdate, sodium molybdate, potassium molybdate, and molybdenum halides. The amino groups may be monoamines, diamines, or polyamines. As an example, the reaction of molybdenum trioxide with a secondary amine and carbon disulfide produces molybdenum dithiocarbamates. Alternatively, the reaction of $(NH_4)_2Mo_3Si_{13}*n(H_2O)$ where n varies between 0 and 2, with a tetralkylthiuram disulfide, produces a trinuclear sulfur-containing molybdenum dithiocarbamate.

Examples of sulfur-containing organomolybdenum compounds include compounds described in the following patents: U.S. Pat. Nos. 3,509,051; 3,356,702; 4,098,705; 4,178,258; 4,263,152; 4,265,773; 4,272,387; 4,285,822; 4,369,119; 4,395,343; 4,283,295; 4,362,633; 4,402,840; 4,466,901; 4,765,918; 4,966,719; 4,978,464; 4,990,271; 4,995,996; 6,232,276; 6,103,674; and 6,117,826.

Glycerides may also be used alone or in combination with other friction modifiers. Suitable glycerides include glycerides of the formula:

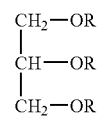

wherein each R is independently selected from the group consisting of H and C(O)R' where R' may be a saturated or an unsaturated alkyl group having from 3 to 23 carbon atoms. Examples of glycerides that may be used include glycerol monolaurate, glycerol monomyristate, glycerol monopalmitate, glycerol monostearate, and mono-glycerides derived from coconut acid, tallow acid, oleic acid, linoleic acid, and linolenic acids. Typical commercial monoglycerides contain substantial amounts of the corresponding diglycerides and triglycerides. These materials are not detrimental to the production of the molybdenum compounds, and may in fact be more active. Any ratio of mono- to di-glyceride may be used, however, it is preferred that from 30 to 70% of the available sites contain free hydroxyl groups (i.e., 30 to 70% of the total R groups of the glycerides represented by the above formula are hydrogen). A preferred glyceride is glycerol monooleate, which is generally a mixture of mono, di, and tri-glycerides derived from oleic acid, and glycerol.

Other Additives

Rust inhibitors selected from the group consisting of nonionic polyoxyalkylene polyols and esters thereof, polyoxyalkylene phenols, and anionic alkyl sulfonic acids may be used.

A small amount of a demulsifying component may be used. A preferred demulsifying component is described in EP 330,522. Such demulsifying component may be obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates and the like.

Foam control can be provided by many compounds including an antifoamant of the polysiloxane type, for example, silicone oil or polydimethyl siloxane.

Seal swell agents, as described, for example, in U.S. Pat. Nos. 3,794,081 and 4,029,587, may also be used.

Viscosity modifiers (VM) function to impart high and low temperature operability to a lubricating oil. The VM used may have that sole function, or may be multifunctional.

Multifunctional viscosity modifiers that also function as dispersants are also known. Suitable viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

Functionalized olefin copolymers that may be used include interpolymers of ethylene and propylene which are grafted with an active monomer such as maleic anhydride and then derivatized with an alcohol or amine. Other such copolymers are copolymers of ethylene and propylene which are grafted with nitrogen compounds.

Each of the foregoing additives, when used, is used at a functionally effective amount to impart the desired properties to the lubricant. Thus, for example, if an additive is a corrosion inhibitor, a functionally effective amount of this corrosion inhibitor would be an amount sufficient to impart the desired corrosion inhibition characteristics to the lubricant. Generally, the concentration of each of these additives, when used, ranges up to about 20% by weight based on the weight of the lubricating oil composition, and in one embodiment from about 0.001% to about 20% by weight, and in one embodiment about 0.01% to about 10% by weight based on the weight of the lubricating oil composition.

Base Oils

Base oils suitable for use in formulating the compositions, additives and concentrates described herein may be selected from any of the synthetic or natural oils or mixtures thereof. The synthetic base oils include alkyl esters of dicarboxylic acids, polyglycols and alcohols, poly-alpha-olefins, including polybutenes, alkyl benzenes, organic esters of phosphoric acids, polysilicone oils, and alkylene oxide polymers, interpolymers, copolymers and derivatives thereof where the terminal hydroxyl groups have been modified by esterification, etherification, and the like.

Natural base oils include animal oils and vegetable oils (e.g., castor oil, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The base oil typically has a viscosity of about 2.5 to about 15 cSt and preferably about 2.5 to about 11 cSt at 100° C.

The following examples are given for the purpose of exemplifying aspects of the embodiments and are not intended to limit the embodiments in any way.

EXAMPLE 1

Product Made With Dispersant

A 1-liter 4-neck flask equipped with a distillation condenser, and nitrogen atmosphere was charged with 538.5 g of polyisobutenyl succinimide dispersant (2100 Mn, about 45 wt. % oil, TBN=23) and 139.3 g of process oil. The mixture was heated to about 90° C. and then 56.8 g (0.2 moles) of titanium isopropoxide was added dropwise over 10-15 minutes. To this mixture, a pre-mixed solution of 36 g (0.6 moles) of isopropanol and 7.2 g (0.4 moles) of water was added dropwise over approx. 25-35 min. After the addition was complete, the mixture was stirred at 90° C. for 3 hrs. The temperature was then increased to 120° C., held for about 45 min. and then vacuum stripped. The product thus obtained was homogenous and contained about 1.43 wt. % Titanium.

EXAMPLE 2

Product Made Without Dispersant

A 1-liter 4-neck flask equipped with a distillation condenser, and nitrogen atmosphere was charged with 678 g of process oil. The mixture was heated to about 90° C. and then 28.4 g (0.1 moles) of titanium isopropoxide was added dropwise over 10-15 min. To this mixture, a pre-mixed solution of 18 g (0.3 moles) of isopropanol and 3.6 g (0.2 moles) of water was added dropwise over approx. 25-35 min. After the addition was complete, the mixture was stirred at 90° C. for 3 hrs. The temperature was then increased to 120° C., held for about 45 min. and then vacuum stripped. The product thus obtained gave a precipitate, believed to be of titanium oxide, was filtered and thoroughly washed with hexane. As shown by comparing this Example 2 with Example 1, a homogenous product substantially devoid of precipitates is made when a dispersant is used in the reaction of titanium isopropoxide and water.

EXAMPLE 3

In the following example, wear scar results were obtained using a high frequency reciprocating rig (HFRR). The results include the product made according to example 1 using 150 solvent neutral process oil and the dispersant with various amounts the titanium additive product. The samples did not contain ZDDP.

TABLE 2

| Sample No. | Dispersant (wt. %) | Titanium Additive Product (ppm Ti) | Wear Scar ($\mu m^2$) |
|---|---|---|---|
| 1 | 0.8 | 0 | 725 |
| 2 | 0.8 | 100 | 615 |
| 3 | 1.3 | 0 | 855 |
| 4 | 1.5 | 300 | 660 |
| 5 | 2.5 | 0 | 743 |
| 6 | 2.4 | 300 | 551 |

The foregoing table provides a comparison of wear scar for three levels of dispersant and two levels of titanium additive product. As shown by the foregoing results, samples containing the titanium additive product exhibited lower wear scar results on the (HFRR) testing rig with the lowest results being obtained by sample 6 containing 300 ppm of the titanium product and 2.4 wt. % of the dispersant.

In order to demonstrate an improvement in the rate of lubricating film formation as well as the area of lubricating film formed as determined by thick pad percent coverage, formulations of the titanium product of Example 1 were made with various amounts of ZDDP and dispersant. Percent coverage included all film measurements >5 nm, and thick pad % coverage is the area of the film with a thickness of greater than >120 nm. The results are provided in the following table.

TABLE 3

| Time (min.) | ZDDP plus Dispersant (wt. %) | | ZDDP, Dispersant and Titanium (1:2) | | ZDDP, Dispersant and Titanium (1:1) | |
|---|---|---|---|---|---|---|
| | % Coverage | Thick Pad % coverage | % Coverage | Thick Pad % coverage | % Coverage | Thick Pad % coverage |
| 0 | 0 | 0 | 0 | 0 | 0 | 0 |
| 10 | 28 | 0 | 45 | 0 | 90 | 0 |
| 20 | 76 | 5 | 87 | 2 | 99 | 9 |
| 30 | 99 | 3 | 97 | 5 | 100 | 11 |
| 40 | 100 | 4 | 98 | 33 | 100 | 0 |
| 50 | 100 | 16 | 99 | 14 | 100 | 9 |
| 60 | 100 | 82 | 100 | 28 | 100 | 20 |

In formulations with ZDDP, the titanium additive product improved the rate of lubricating film formation as well as percent coverage of the thick pads. Formulations with the titanium additive product made with a mole ratio of titanium isopropoxide to water of 1:2 had higher initial film coverages as compared to the ZDDP and dispersant formulations that did not contain the titanium additive product. The two types of titanium additive products tested had initial percent coverages of 45 and 90% as compared to the control blend of ZDDP and dispersant which only had an initial film coverage of 28%. The blends containing the titanium additive product also had higher average thick pad coverages during the beginning of the run. The runs made with only the ZDDP and dispersant had an average thick pad coverage of 3%, while the runs made with the titanium additive product exhibited 10 and 5% thick pad coverages, respectively for the initial 40 minutes of the runs presented in table 3.

An important advantage of the titanium additive product of the disclosure is that the product is less corrosive than a surface modified product made using acid. In the following example a titanium product was made using an acid source.

EXAMPLE 4

Titanium Neodecanoate Titanium Compound Made From an Acid Source

Neodecanoic acid (about 600 grams) was placed into a reaction vessel equipped with a condenser, Dean-Stark trap, thermometer, thermocouple, and a gas inlet. Nitrogen gas was bubbled into the acid. Titanium isopropoxide (about 245 grams) was slowly added to the reaction vessel with vigorous stirring. The reactants were heated to about 140° C. and stirred for one hour. Overheads and condensate from the reaction were collected in the trap. A subatmospheric pressure was applied to the reaction vessel and the reactants were stirred for about an additional two hours until the reaction was complete. Analysis of the product indicated that the product had a kinematic viscosity of about 14.3 cSt at about 100° C. and a titanium content of about 6.4 percent by weight.

A high temperature corrosion bench test (HTCBT) according ASTM D6594 was used to evaluate the corrosive tendencies at a high temperature, e.g., 135° C. According to the HTCBT test four metal coupons including copper, lead, tin and phosphor bronze are immersed in a measured amount of oil. Air is passed through the oil at an elevated temperature for a period of time. When the test is completed, the coupons and stressed oil are examined to detect corrosion. Concentrations of copper, lead and tin are determined. A fully formulated heavy duty diesel (HDD) lubricating oil was used in each of the tests. The results of the HTCBT test on the HDD oil without the titanium additive and with the titanium additives of Examples 1 and 4 are contained in the following table.

TABLE 4

| Sample No. | Formulation | Titanium Additive Product (ppm Ti) | HTCBT (lead, ppm) |
|---|---|---|---|
| 1 | Fully Formulated HDD oil A | 0 | 22 |
| 2 | Fully Formulated HDD oil A | 100 (Example 4) | 59 |
| 3 | Fully Formulated HDD oil A | 100 (Example 1) | 18 |

As shown by the foregoing example, a titanium additive product made using an acid source (Sample 2) was significantly more corrosive than the base oil (Sample 1) or the base oil containing the titanium additive according to the disclosure (Sample 3). Accordingly, it is believed that the titanium additive product made according to the disclosure may be less corrosive when used as an additive for an engine lubricant than titanium additive products made using an acid source.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the invention being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A method for making a titanium-containing, lubricant additive comprising reacting titanium alkoxide with water in the presence of an organic dispersant selected from the group consisting of hydrocarbyl succinimides, hydrocarbyl amines, and Mannich base dispersants and an alkanol to provide a homogeneous titanium-oxide additive product, wherein additive product is substantially devoid of acidic characteristics.

2. The method of claim 1, wherein the dispersant comprises a hydrocarbyl succinimide dispersant.

3. The method of claim 1, wherein the alkanol comprises a $C_2$-$C_5$ alkanol.

4. The method of claim 3, wherein the alkanol comprises isopropanol.

5. The method of claim 4, wherein the titanium alkoxide comprises titanium isopropoxide.

6. The method of claim 1, wherein a mole ratio of water to titanium alkoxide ranges from about 1:1 to about 2:1.

7. The method of claim 3, wherein a weight ratio of alkanol to water ranges from about 1:10 to about 10:1.

8. The method of claim 1, wherein the reaction of titanium alkoxide and water is conducted at a temperature ranging from about 25° to about 140° C.

9. A non-acidic titanium-oxide additive product made by the process of claim 1.

10. A lubricating composition comprising the additive product of claim 9 and an oil of lubricating viscosity.

11. A lubricant additive concentrate comprising the additive product of claim 1 wherein the concentrate comprises from about 0.01 to about 2.0 weight percent titanium on a metal basis from the titanium-oxide additive product.

12. A lubricant additive concentrate comprising the additive product of claim 9 wherein the concentrate comprises from about 0.1 to about 1.0 weight percent titanium on a metal basis from the titanium-oxide additive product.

13. A lubricating composition comprising the additive product of claim 9 and an oil of lubricating viscosity, wherein the lubricating composition comprises from about 10 to about 1000 ppm titanium on a metal basis.

14. A lubricating composition comprising the additive product of claim 9 and an oil of lubricating viscosity, wherein the lubricating composition comprises from about 50 to about 500 ppm titanium metal.

15. A titanium additive product for a lubricating oil comprising a titanium product made by a process comprising reacting titanium alkoxide with water in the presence of an organic dispersant selected from the group consisting of hydrocarbyl succinimides, hydrocarbyl amines, and Mannich base dispersants and an alkanol at a temperature ranging from about 25° to about 140° C. to provide a homogeneous titanium-oxide additive product, wherein additive product in a base oil is no more corrosive than the base oil devoid of the additive product as determined by a high temperature corrosion bench test.

16. The titanium additive product of claim 15, wherein the dispersant comprises a hydrocarbyl amine dispersant.

17. A lubricating oil concentrate comprising the additive product of claim 15, wherein the concentrate is substantially devoid of visible particles.

18. A fully formulated lubricant comprising the lubricating oil concentrate of claim 17.

19. The method of claim 1, wherein the additive product comprises titanium-oxide nanoparticles.

20. The additive product of claim 15, wherein the additive product comprises titanium-oxide nanoparticles.

* * * * *